March 14, 1967 A. L. WELLFORD 3,309,600
D.C. TO A.C. INVERTER ARRANGEMENT
Filed Jan. 30, 1963 4 Sheets-Sheet 1

INVENTOR.
ARMISTEAD L. WELLFORD
BY Isidore Match
HIS ATTORNEY

March 14, 1967     A. L. WELLFORD     3,309,600
D.C. TO A.C. INVERTER ARRANGEMENT
Filed Jan. 30, 1963     4 Sheets-Sheet 4
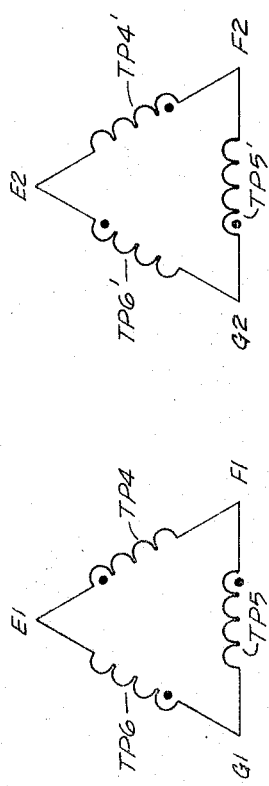
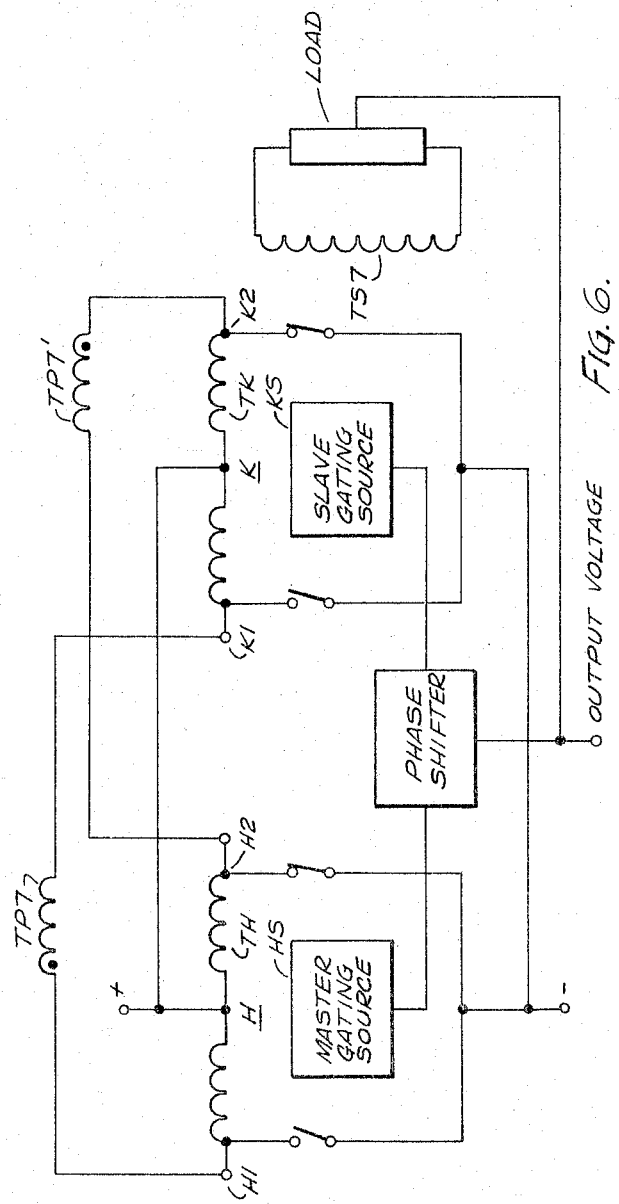
INVENTOR.
ARMISTEAD L. WELLFORD
BY Isidore Match
HIS ATTORNEY

United States Patent Office 3,309,600
Patented Mar. 14, 1967

3,309,600
D.C. TO A.C. INVERTER ARRANGEMENT
Armistead L. Wellford, Waynesboro, Va., assignor to General Electric Company, a corporation of New York
Filed Jan. 30, 1963, Ser. No. 254,920
8 Claims. (Cl. 321—45)

This invention relates to inverters. More particularly, it relates to arrangements for improved utilization of the output transformers in such inverters.

With the advent of semiconductor devices such as the transistor and the gate controlled rectifier, there has been enabled the construction of static inverting and converting circuits which are of comparatively low weight and long life and which have substantially little maintenance requirements. Whether transistors or silicon controlled rectifiers are utilized, proportionately greater respective D.C. voltages can be handled by inverter circuits of bridge configuration.

Generally, the inverter bridges produce square wave outputs which are combined and the resultant of such combination may be passed through a suitable low-pass filter if it is desired to obtain a comparatively pure sinusoidal output waveform. To obtain voltage regulation, the combined output voltage resulting from the combining can be compared with a desired reference voltage and the resultant of this comparison can be utilized to vary the phase of the output of one bridge with respect to the other bridge so that the resultant of their combined outputs is a quasi-square wave.

In the aforesaid bridge inverters, the output transformer has ofter comprised 50% or more of the total electrical component weight of the circuit. This can be understood when it is realized that, heretofore, each bridge has required its own separate transformer, each transformer having at least a primary and a secondary winding. To obtain the combined output, windings of the different transformers have been connected in series and in the proper polarity, such connection providing "phasor," i.e., vectorial addition of the individual inverter outputs.

Where separate output transformers have to be utilized for each inverter, such transformers have to be designed to be able to withstand the maximum amount of volt-seconds that the respective individual inverters can produce. Effectively, this means that in normal aplications, the transformers have to be designed to handle about 50% more volt-seconds than the combined output generally contains. Since weight is at a premium in most inverter applications such as in power systems for airborne vehicles, portable equipment, etc., and since transformers are quite expensive, a saving of weight and expense in inverter output transformers is a great necessity.

An approach to reducing the output transformer size is to take advantage of the principle of flux addition through the use of non-standard core punchings, for example, E-type punchings in which the area of the center leg is less than the sum of the area of two outside legs. However, this approach is not very effective and permits only a slight reduction in transformer size and weight.

Accordingly, it is an important object of this invention to provide an arrangement in a power inversion system comprising a plurality of static inverters wherein there is required only a single output transformer for obtaining the combined outputs of the individual inverters.

It is a further object to provide an arangement in accordance with the preceding object wherein such output transformer need not be designed to withstand the maximum volt-seconds of the inverters.

Generally speaking and in accordance with the invention, there is provided in a power conversion system comprising a plurality of inverters, each of the inverters comprising first and second circuit legs adapted to be connected to a unidirectional potential source, the first legs converting the potential from the source to an alternating current voltage of one polarity and the second legs converting the potential from the source to an alternating current voltage of the opposite polarity; an output transformer for the system which comprises a first primary winding coupling the aforesaid first legs and a second primary winding coupling the aforesaid second legs.

The novel features, which are believed to be characteristic of this invention, are set forth with particularity in the appended claims. The invention itself, however, both as to organization and method of operation, together with further objects and advantages thereof, may best be understood by reference to the following description when taken in connection with the accompanying drawings.

In the drawings:

FIGS. 5a and 5b illustrate the output transformer primary winding connections in the arrangement of FIG. 4; and FIG. 6 is a diagram similar to the diagram of FIGS. 1, 2 and 4 and which shows a power conversion system comprising a plurality of center-tapped parallel inverters constructed in accordance with the principles of the invention.

Figure 1:
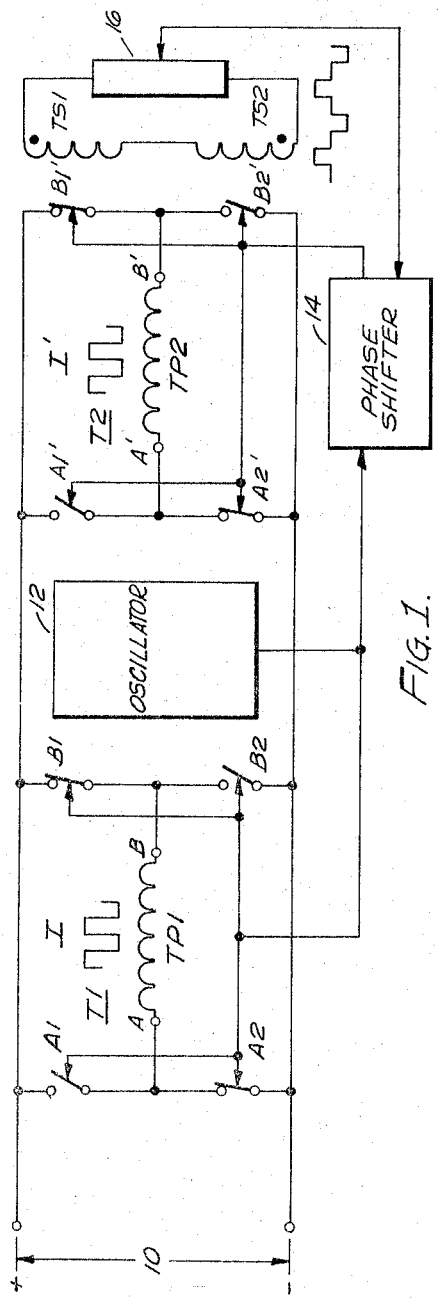
FIG. 1 is a diagram which conceptually illustrates the structure and operation of presently known power conversion systems comprising a plurality of bridge inverters.

Referring now to FIG. 1, there is shown conceptually, the presently known arrangement for providing a combined output quasi-square wave from two inverters, each of which produce square wave outputs of the same frequency but which are displaced in phase an amount in accordance with the deviation of the combined output of the inverters from a chosen value. The voltage switching devices therein, which may be active devices such as relays, thyratrons, transistors, or silicon controlled rectifiers, are depicted, for convenience of explanation as electromechanical switches.

Thus, in FIG. 1, respective pairs of switches $A_1$ and $B_2$, and switches $B_1$ and $A_2$ in inverter I are concurrently in the same state (open or closed) and the output developed across primary windings TP1 and secondary winding TS1 of transformer T1 is a square wave. Similarly, in inverter I', respective pairs of switches $A_1'$ and $B_2'$ and switches $B_1'$ and $A_2'$ are concurrently in the same state and the output developed across primary winding TP2 and secondary winding TS2 of transformer T2 is also a square wave. Oscillator 12 is shown in inverter I as providing switching pulses of one phase to switches $A_1$ and $B_2$ and of the opposite phase to switches $B_1$ and $A_2$. The output of oscillator 12 is shifted in phase by phase shifter 14. This phase shifted signal is applied in inverter I' in one phase to switches $A_1'$ and $B_2'$ and in the opposite phase to switches $A_2'$ and $B_1'$. The outputs of inverters I and I' are combined by the serial connection of secondary winding TS1 and TS2 of transformers T1 and T2 respectively in the polarity as shown by the polarity dots thereon to provide a quasi-square wave output whose dwell angle is in accordance with the phase difference of the inverter outputs, such combined output appearing across a load 16. The deviation of the load voltage from a desired voltage is applied to phase shifter 14 to determine the degree of phase shift between the outputs of inverters I and I' and thereby to provide output voltage regulation.

It is seen in the known circuit of FIG. 1 that separate transformers T1 and T2 are required for inverters I and I' respectively. Each of these transformers have to be designed to handle the maximum volt-seconds that respective inverters I and I' produce.

Figure 2:
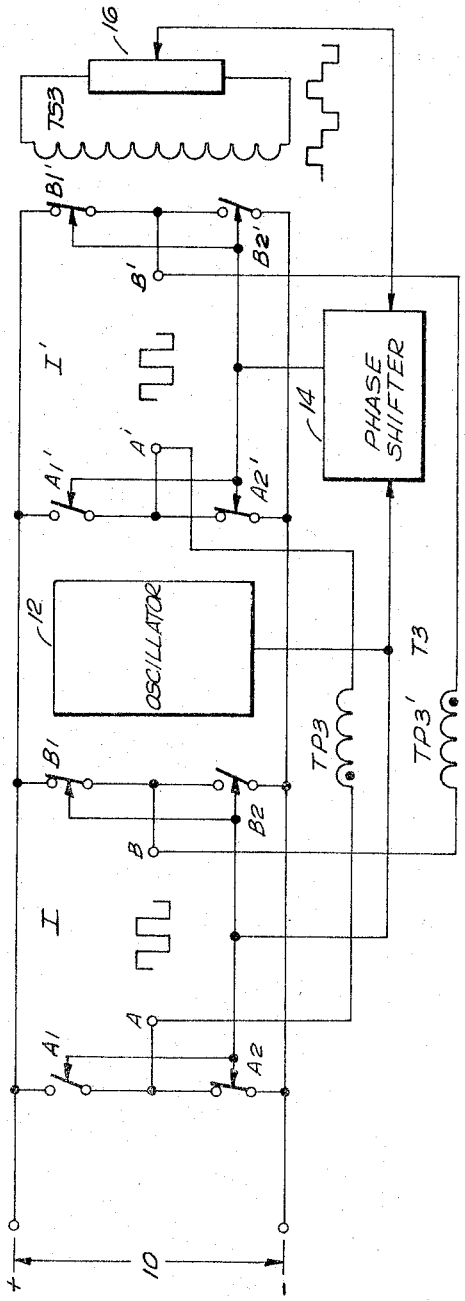
FIG. 2 is a diagram similar to that of FIG. 1 and conceptually illustrates a power conversion system comprising a plurality of bridge inverters and which is constructed in accordance with the principles of the invention.

In the arrangement of FIG. 2 which is constructed in accordance with the principles of the invention, the need for designing separate inverter transformers to handle maximum respective inverter volt-second outputs is eliminated. In FIG. 2, to the extent that the circuit depicted therein is similar to the circuit of FIG. 1, like structures have been designated with the same numerals.

In FIG. 2, it is seen that the transformers T1 and T2 of FIG. 1 have been replaced by a single transformer T3. Transformer T3 comprises a first primary winding TP3 connected between points A and A' and a second and, if desired, like primary winding TP3' connected between points B and B'. Both of these primary windings are inductively coupled of a secondary winding TS3 of transformer T3.

In the operation of the circuit of FIG. 2, the phasor summation in primary winding TP3 of the phase displaced square waves appearing at points A and A' and the phasor summation in primary winding TP3' of the phase displaced square waves appearing at points B and B' result in the appearing of quasi-square waves in these windings. From the voltage polarities present in primary winding TP3 and TP3' as shown by the polarity dots thereon, it is seen that the voltages in both of these primary windings are identical if primary windings TP3 and TP3' are identical, and in phase. Thus, load current sharing by each of bridge inverters I and I' is effected. It is to be realized that if other than equal load sharing is desired such as in unsymmetrical bridge inverters wherein the switching devices such as silicon controlled rectifiers, for example, in the respective arms have different current ratings, this can be accomplished by unbalancing the respective resistances of the primary windings.

The output of the circuit of FIG. 2 appears across the single secondary winding TS3 of transformer T3.

Figure 3:
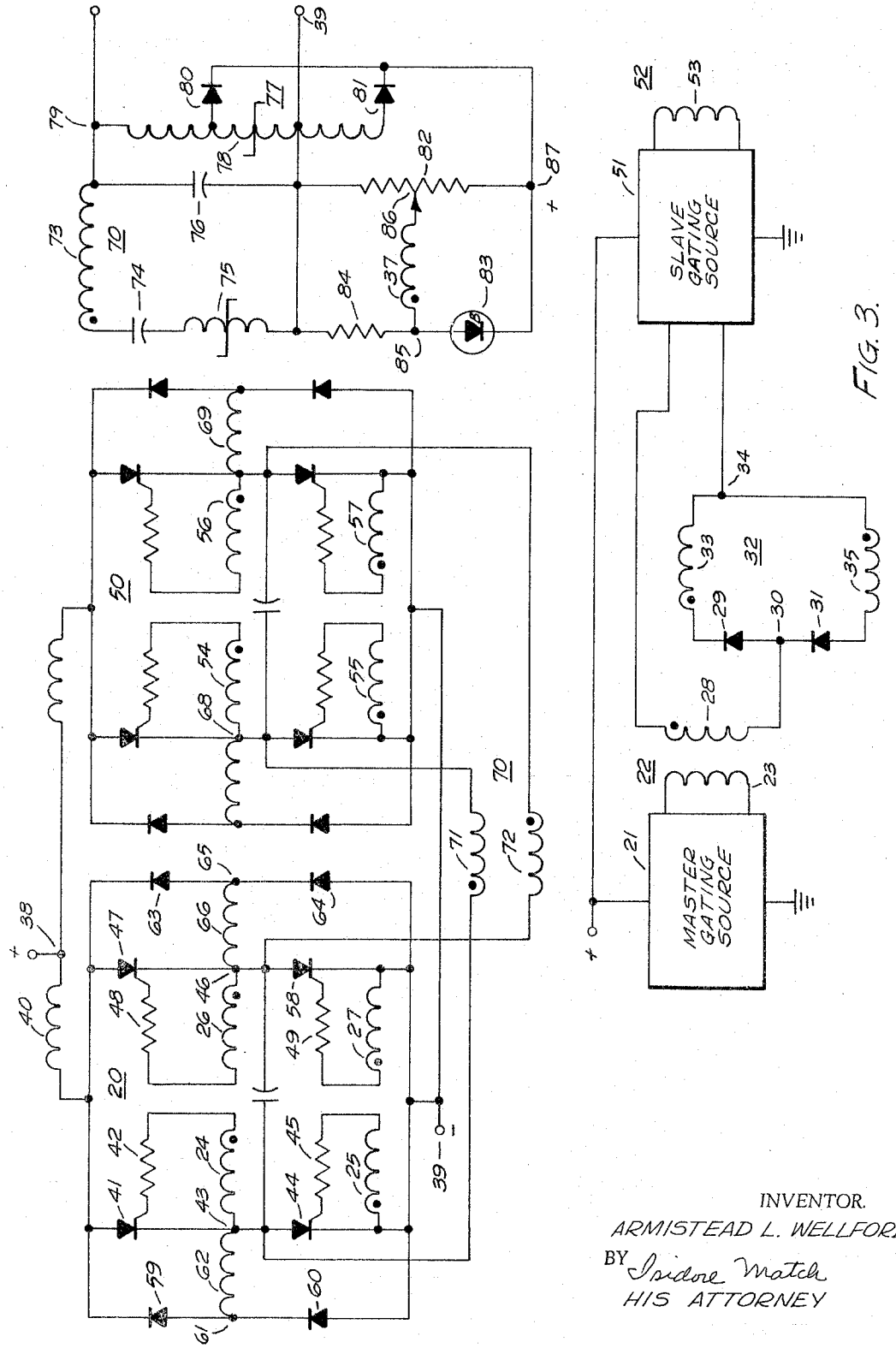
FIG. 3 shows a schematic depiction of an illustrative embodiment of the arrangement of FIG. 2.

In FIG. 3 there is shown a schematic diagram of an example of a static inverter constructed in accordance with the principles for the invention as conceptually depicted in FIG. 2. The static inverter of FIG. 3 embodies silicon controlled rectifiers as the switching devices therein and comprises two bridge inverters which produce square wave outputs that are in synchronism but displaced in phase with respect to each other and a single output transformer which has two primary windings coupled to a secondary winding.

Thus, as shown in FIG. 3, if for convenience of description of structure and operation, the bridge inverter 20 is designated as the "master" inverter and bridge inverter 50 is designated as the "slave" inverter, then gating sources 21 and 51 which effect the conductivity in the silicon controlled rectifiers of inverters 20 and 50 respectively may also be conveniently designated as the "master" gating source and the "slave" gating source. Gating sources 21 and 51 may suitably comprise magnetic coupled multivibrators which produce an output voltage having a frequency in accordance with the supply voltage applied thereto. Such supply voltage is desirably a regulated voltage to provide compartively constant frequency outputs from the gating sources.

The output transformer 22 of master gating source 21 comprises a primary winding 23 and second windings 24, 25, 26 and 27 in inverter 20 and a secondary winding 28. The output transformer 52 of slave gating source 51 comprises a primary winding 53 and secondary windings 54, 55, 56 and 57 in inverter 50. One terminal of a secondary winding 28 of transformer 22 is connected to provide drive to an active device in slave gating source 51, such as the base of a transistor contained therein, the other terminal of secondary winding 28 being connected to the junction 30 of diodes 29 and 31 which re included in a self-saturating magnetic amplifier, i.e., an "amplistat," magnetic amplifier 32 functioning to provide a phase shift in accordance with the deviation of the output voltage of the system from a desired value as will be further shown hereinbelow. Magnetic amplifier 32 also comprises gate windings 33 and 35, the junction 34 of which is connected to supply drive to the other active device in slave gating source 51 which may be the base electrode, for example, of the other transistor therein. The control winding 37 of magnetic amplifier 32 is included in the output voltage comparison circuit and a voltage is developed thereacross whose magnitude represents the difference between the output voltage and a reference voltage that represents the desired output. The direction of the voltage on control winding 37 represents whether such output voltage is greater or less than the desired output voltage.

In the operation of gating sources 21 and 51, in conjunction with magnetic amplifier 32, it is seen that current from the nonpolarity dot terminal of secondary winding 28 of transformer 22 is passed through diode 29 and through gate winding 33 to the drive electrode of the active device in slave gating source 51. Depending upon the volt-second characteristic of the core material of magnetic amplifier 32, when its core saturates due to the current in gate winding 33, the sudden drop in the impedance of winding 33 and the consequent change of potential at the drive electrode of the active device to which it is connected rapidly causes a switching of conductivity between the active devices in slave gating source 51. The volt-second characteristic of the core of magnetic amplifier 32 and the error voltage generated on control winding 37 determine the amount of phase displacement between the outputs of gating sources 21 and 51. The core material of magnetic amplifier 32 is preferably chosen to have a volt-second characteristic whereby its time of switching from saturation in one direction to saturation in the other direction does not exceed the time of a half cycle of output from master gating source 21 whereby the phase difference permitted between the outputs of gating source 21 and 51 is up to a maximum of 180°.

In bridge inverter 20, there is connected between the positive terminal 38 and the negative terminal 39 of the unidirectional potential source (not shown) whose output is to be switched to a square wave output, a series arrangement of an inductor 40 and the parallel combination of the series arrangements of silicon controlled rectifiers 41 and 44 and silicon controlled rectifiers 47 and 58. Connected between the gate electrode of silicon controlled rectifier 41 and the junction 43 of the cathode electrode of silicon controlled rectifier 41 and the anode electrode of silicon controlled rectifier 44 is the series arrangement of secondary winding 24 of transformer 22 and a resistor 42. Connected between the cathode and gate electrodes of silicon controlled rectifier 44 is the series arrangement of secondary winding 25 of transformer 22 and a resistor 45. Connected between the gate electrode of silicon controlled rectifier 47 and the junction 46 of the cathode electrode of silicon controlled rectifier 47 and the anode electrode of silicon controlled rectifier 58 is a series arrangement of secondary winding 26 of transformer 22 and a resistor 48 and connected between the cathode and the gate electrodes of silicon controlled rectifier 58 is the series arrangement of secondary winding 27 of transformer 22 and a resistor 49.

A series arrangement of the cathode to anode paths of pumpback diodes 59 and 60 is connected between the anode of silicon controlled rectifier 41 and negative terminal 39, an inductor 62 being inserted between junction 43 and the junction 61 of the anode of diode 59 and the cathode of diode 60. Similarly, there is connected between the anode of silicon controlled rectifier 47 and negative terminal 39, the series arrangement of the cathode to anode paths of pumpback diodes 63 and 64, an inductor 66 being provided between junction 46 and the junction 65 of the anode of diode 63 and the cathode of diode 64.

In the operation of a bridge inverter such as inverter 20, it is seen by the designating polarity dots shown on secondary windings 24, 25, 26 and 27 that silicon controlled rectifiers 41 and 58, and in turn silicon controlled rectifiers 47 and 44 are respectively rendered substantially simultaneously conductive by the output of master gating source 21.

Bridge inverter 50 is substantially identical to bridge inverter 20 both in structure and operation, the transformer windings 54, 55, 56 and 57 in circuit with the gate electrodes of the respective silicon controlled rectifiers contained therein are secondary windings of transformer 52 of slave gating source 51. Accordingly, it is seen by the polarity dots on these secondary windings that diagonally disposed silicon controlled rectifiers in bridge inverter 50 are rendered conductive concurrently.

In a primary winding 71 of an output transformer 70 which is connected between junctions 43 and 68 in inverters 20 and 50 respectively, the phase displaced square waves appearing at these junctions are vectorially added whereby a quasi-square wave appears in primary winding 71, the dwell angle in this wave depending upon the phase displacement between the outputs at these junctions. Similarly, in primary winding 72 of output transformer 70 which may be identical to primary winding 71, the phase displaced square wave outputs appearing at junctions 46 and 69 are vectorially added. The polarity dot designations shown on primary windings 71 and 72 indicate that there also appear in these windings, if they are identical, like quasi-square waves which are in phase. The output of the circuit appears across secondary winding 73 of output transformer 70 which is inductively coupled to primary windings 71 and 72.

The system output may be passed through an output filter which comprises a series arrangement of a capacitor 74 and a saturable inductor 75 and a parallel arrangement of a capacitor 76 and the inductance of that portion 78 of a saturable transformer 77 between terminal 79 and negative terminal 39. Capacitor 74 and inductor 75 are tuned to series resonance at the frequency at the outputs of gating sources 21 and 51, i.e., the desired fundamental output frequency, and capacitor 76 and inductance 78 can be tuned to parallel resonance at the same frequency. Inductor 75 presents a high impedance to higher harmonics as compared with the impedance presented by capacitors 74 and 76 and therefore has most of the harmonics dropped across it. Capacitor 76 supplies energy to the output during the portion of the cycle when bridge inverters 20 and 50 are not enabled. Inductor 75 may be chosen to be of a saturable type and thereby provide a form of current limiting. Thus, if the current through inductor 75 exceeds a certain value, it saturates at each half cycle thereby detuning the LC circuit comprising it and capacitor 74 and thus dropping much of the fundamental, i.e., the desired output across it.

The output appearing at point 79 may be developed across a saturable transformer 77 which is tapped to the negative terminal 39 at about its 2/3 point. A portion of the output voltage appearing across transformer 77 is full wave rectified by diodes 80 and 81 and this rectified voltage is applied to the parallel combination comprising a variable resistor 82 and the series arrangement of the cathode to anode path of a reference diode 83 which may be a Zener diode and a resistor 84, control winding 37 of magnetic amplifier 32 being connected between the junction 85 of diode 83 and resistor 84 and a point 86 on resistor 82.

It is seen that when the voltage at point 87 is of the proper value, there is substantially no voltage developed across control winding 37. When the voltage at point 87 is below the proper value, the voltage developed on winding 37 is in amplitude and polarity such that there is provided increased output from magnetic amplifier 32 and the phase difference between the outputs of gating sources 21 and 51 is decreased. Consequently, the output appearing on output transformer 70 is increased. When the voltage at point 87 exceeds the desired value, this voltage effects the development of an error voltage on control winding 37 in a polarity such as to decrease the output of magnetic amplifier 32 and thereby to widen the phase displacement between the outputs of the respective gating sources 21 and 51 and correspondingly between the outputs of bridge inverters 20 and 50. In this manner, the A.C. output voltage of the system is regulated.

It is to be noted that the voltage appearing at junction 85 is not purely a direct current voltage but is a direct current voltage with a small slice taken out of it each half cycle due to the nature of the voltage waveform applied thereto. With such arrangement, there is desirably regulated substantially the R.M.S. output voltage rather than the average voltage.

The functions of transformer 77 are to provide a suitable means for full-wave center-tapped sensing as applied to diodes 80 and 81. Also, under transient high voltage conditions, transformer 77 saturates, thereby limiting the average output voltage and causing such voltage to return its normal level faster than it would normally so do, thereby providing voltage clamping action.

Figure 4:
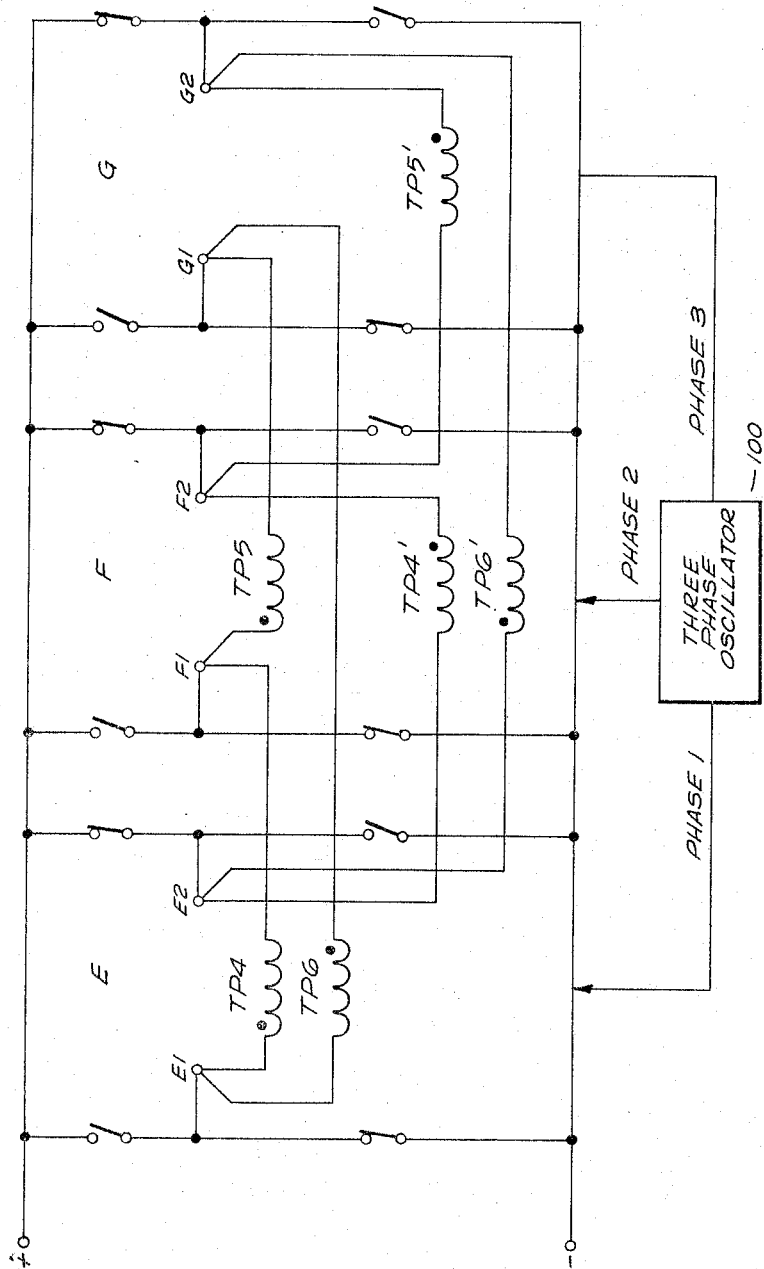
FIG. 4 is a diagram similar to the diagrams of FIG. 1 and 2 and which shows a polyphase power conversion system comprising a plurality of bridge inverters constructed in accordance with the principles of the invention.

In FIG. 4 there is shown an arrangement which conceptually depicts a polyphase arrangement embodying the principle of the invention. In FIG. 4, inverters E, F, and G may suitably be bridge inverters such as schematically depicted in the circuit of FIG. 3. Balanced three phase oscillator 100 provides pulses which are 120° displaced in phase with respect to each other to the switching devices of the inverters as explained hereinabove to effect the production of three square wave outputs from inverters E, F and G which are also 120° displaced in phase with respect to each other.

The three respective square wave outputs of these inverters cannot be impressed directly on a conventional E-core transformer because the E core presents a magnetic short circuit to the third harmonics and the multiples thereof present in the square waves. However, with a primary winding TP4 connected between points $E_1$ and $F_1$ in inverters E and F, a primary winding TP5 connected between points $F_1$ and $G_1$ in inverters F and G, and a primary winding TP6 connected between points $E_1$ and $G_1$ in inverters E and G and with these primary windings connected in delta configuration as shown in FIG. 5a in the polarities as shown by the designating polarity dots thereon, then in each primary winding there appears a quasi-square wave whose pulses have 120° widths and 60° dwell angles therebetween and the outputs on the three primary windings are balanced in phase displacement. Such quasi-square waves, of course, contain no third harmonics or multiples of such third harmonics.

To provide the double primary winding connection in accordance with the principles of the invention, a primary winding TP4' is connected between points $E_2$ and $F_2$ in bridge inverters E and F, a primary winding TP5' is connected between points $F_2$ and $G_2$ in bridge inverters F and G and a primary winding TP6' is connected between points $E_2$ and $G_2$ in bridge inverters E and G. If primary windings TP4', TP5' and TP6' are connected in delta configuration as shown in FIG. 5b with the polarities as shown by the designating polarity dots thereon and if windings TP4', TP5' and TP6' are identical to the corresponding windings TP4, TP5 and TP6, then windings TP4, TP5 and TP6 and windings TP4', TP5' and TP6' will have correspondingly indentical quasi-square waves therein in phase with each other.

With the arrangements of FIG. 4 and FIGS. 5a and 5b, there can be used the conventional E-core transformers instead of the three single phase transformers that were heretofore required thereby effecting a significant saving in transformer expense and weight. Furthermore, the magnetics of the transformers need not be designed to withstand the maximum volt-seconds that the individual bridge inverters can produce.

In FIG. 6 there is shown an arrangement which conceptually depicts how the principles of this invention can be applied to the center-tapped parallel type inverter. An example of such inverter is the one disclosed on page 152 of the Silicon Controlled Rectifier Manual, second edition, published by the General Electric Company.

In FIG. 6, assuming that inverters H and K produce like square wave outputs which are displaced in phase in accordance with the displacement in phase between the outputs of master gating source HS and slave gating source KS, then a first primary winding TP7 of an output transformer T7 is connected between points $H_1$ and $K_1$ of inverters H and K and a second primary winding TP7' is connected between points H2 and K2 of inverters H and K in the polarities as shown by the designating polarity dots. It is noted that each of the center-tapped inverters H and K respectively in the arrangement of FIG. 6 have to have their separate output transformers TH and TK and it is the outputs of these transformers which are vectorially added in primary windings TP7 and TP7'. The single secondary winding TS7 of the output transformer is coupled to windings TP7 and TP7' and has developed thereacross the output of the circuit which is a quasi-square wave whose dwell angle is dependent upon the degree of phase displacement between the outputs of the inverters imparted by the action of the phase shifter interposed between gating sources HS and KS. The separate inverter transformers TH and TK have to be designed to withstand maximum volt-seconds. However, the arrangement of FIG. 6 permits the use of three phase magnetics which results in better phase and voltage balance.

While there have been shown particular embodiments of this invention, it will, of course, be understood that it is not wished to be limited thereto since different modifications may be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. In a power conversion system comprising a plurality of inverters, each of said inverters respectively comprising first and second parallel arrangements of first and second circuit legs adapted to be connected across a unidirectional potential source, each of said first and second legs comprising a series arrangement of a plurality of switching devices having respective first and second junctions therebetween, each of said switching devices capable of being in a conductive or a nonconductive state, means for energizing said switching devices whereby a first switching device in one leg and a second switching device in the other leg of an inverter are concurrently in one of said states while the other respective switching devices in said legs concurrently are in the other of said states, and means coupled to said switching devices for causing said switching devices to assume said states; a first transformer winding coupling certain ones of said junctions, a second transformer winding coupling the other ones of said junctions; and output transformer winding means coupled to said first and second windings.

2. In a power conversion system comprising a plurality of bridge inverters, each of said inverters respectively comprising first and second parallel arrangements of first and second circuit legs adapted to be connected across a unidirectional potential source, each of said first and second legs comprising a series arrangement of a plurality of switching devices having respective first and second junctions therebetween, each of said switching devices capable of being in a conductive or a nonconductive state, means for energizing said switching devices whereby a first switching device in one leg and a second switching device in the other leg of an inverter are concurrently in one of said states while the other respective switching devices in said legs concurrently are in the other of said states, and means coupled to said switching devices for causing said switching devices to assume said states; a transformer comprising a first winding coupling said first junctions, a second winding coupling said second junctions, said windings being so poled whereby the outputs appearing in said windings are in phase and a third winding coupled to said first and second windings.

3. In a power conversion system comprising a plurality of bridge inverters, each of said inverters comprising first and second parallel arranged circuit legs adapted to be connected across a unidirectional potential source having a positive and negative terminal, each of said first and second legs comprising a series arrangement of a plurality of gate controlled rectifiers having respective first and second junctions therebetween, the anode of a first gate controlled rectifier in a leg being adapted to be connected to said positive terminal, the cathode of a second gate controlled rectifier in a leg being adapted to be connected to said negative terminal and oscillating means for alternately gating into conductivity combinations of a first and second gate controlled rectifiers of different legs in an inverter; an output transformer for providing the combined outputs of said inverters comprising a first primary winding coupling said first junctions, a second primary winding coupling said second junctions, said first and second primary windings being so poled whereby the outputs appearing therein are in phase.

4. In a power conversion system comprising a plurality of bridge inverters, the output of said system being the resultant of the combining of said outputs, each of said inverters comprising first and second parallel arranged circuit legs adapted to be connected across a unidirectional potential source having a positive and a negative terminal, each of said legs comprising a series arrangement of a plurality of gate controlled rectifiers having respective first and second junctions therebetween, the anode of a first gate controlled rectifier in a leg being adapted to be connected to said positive terminal, the cathode of a second gate controlled rectifier in a leg being adapted to be connected to said negative terminal, first and second oscillators coupled to the gate controlled rectifiers of first and second bridge inverters respectively for alternately gating into conductivity a combination of a first gate controlled rectifier of one leg and a second gate controlled rectifier of the other leg, a phase shift means coupling said first oscillator to said second oscillator for effecting an output from said second oscillator which is in synchronism with and displaced in phase with respect to the output of said first oscillator, the degree provided by said phase shift means being in accordance with the deviation of the value of said system output from a chosen value; an output transformer in said system comprising a first primary winding coupling said first junctions, a second primary winding coupling said second junctions, said first and second primary windings being so poled whereby the outputs appearing therein are in phase and a secondary winding in which there is developed said system output.

5. In a power conversion system comprising a chosen plurality of bridge inverters, each of said inverters comprising first and second parallel arranged circuit legs adapted to be connected across a unidirectional potential source having a positive and a negative terminal, each of said first and second legs comprising a series arrangement of a plurality of gate controlled rectifiers having respective first and second junctions therebetween, the anode of a first gate controlled rectifier in a leg being adapted to be connected to said positive terminal, the cathode of a second gate controlled rectifier in a leg being adapted to be connected to said negative terminal, oscillating means having said plurality of balanced phase outputs coupled to said gate controlled rectifiers, each of said oscillating means outputs functioning to alternately gate into conductivity the combination of a first gate controlled rectifier of a first leg and a second gate controlled rectifier of the second leg of a bridge inverter whereby there are provided balanced phase outputs from said bridge inverters; a first output transformer comprising a first primary winding coupling the first junctions of first and second bridge inverters and a second primary winding coupling the second junctions of said first and second inverters, a second output transformer comprising a first primary winding coupling the first junctions of said second and third inverters and a second primary winding coupling the second junctions of said second and third inverters, and a third output transformer comprising a first primary winding coupling the first junctions of said first and third inverters and a second primary winding coupling the second junctions of said first and third inverters, the primary windings of each output transformer being so poled whereby the outputs appearing therein are in phase.

6. In a power conversion system as defined in claim 5 wherein the first primary windings and the second primary windings of said output transformers are connected in respective delta configurations.

7. In a power conversion system comprising a plurality of center tapped inverters, the output of said system being the resultant of the combining of the said inverter outputs, each of said inverters comprising first and second legs having switching means therein and an output transformer having first and second terminals and connecting said legs at said terminals, the combination of said transformer and said legs being adapted to be connected across a unidirectional potential source, each of said legs comprising a switching device capable of being in a conducting and a nonconducting state, said switching devices concurrently being in different states, said plurality of oscillating means, each of said respective oscillating means alternately concurrently effecting changes of states in the switching devices of an inverter, phase shifting means coupling a first oscillating means to a second oscillating means for effecting an output from the second oscillating means which is in synchronism with and displaced in phase from the output of said first oscillating means in accordance with the deviation of the value of said system output from a chosen value; a combining transformer comprising a first primary winding connecting said first terminals and a second primary winding connecting said second terminals, said windings being so poled as to provide outputs therein which are in phase with each other.

8. In a power conversion system as defined in claim 7 wherein said switching devices are gate controlled rectifiers and wherein each of said oscillating means are coupled to the gate electrodes of said gate controlled rectifiers to alternately gate into conductivity, the gate controlled rectifiers comprising an inverter.

References Cited by the Examiner
UNITED STATES PATENTS

| 2,990,517 | 6/1961 | Grieg | 321—45 X |
| 3,060,363 | 10/1962 | Jensen | 321—45 X |
| 3,200,321 | 8/1965 | Rosenstein | 321—45 X |
| 3,234,450 | 2/1966 | Jennings | 321—43 X |

JOHN F. COUCH, *Primary Examiner.*

W. M. SHOOP, *Assistant Examiner.*